UNITED STATES PATENT OFFICE.

PAUL EHRLICH AND PAUL KARRER, OF FRANKFORT-ON-THE-MAIN, GERMANY, ASSIGNORS TO FARBWERKE VORM. MEISTER LUCIUS & BRUNING, OF HÖCHST-ON-THE-MAIN, GERMANY, A CORPORATION OF GERMANY.

ARSENOSTIBINO COMPOUNDS AND PROCESS OF MAKING SAME.

1,108,154.     Specification of Letters Patent.     Patented Aug. 25, 1914.

No Drawing.     Application filed July 30, 1913. Serial No. 782,014.

*To all whom it may concern:*

Be it known that we, PAUL EHRLICH, M. D., professor of medicine, and PAUL KARRER, Ph. D., chemist, citizens of the Empire of Germany and the Republic of Switzerland, respectively, residing at Frankfort-on-the-Main, Germany, have invented certain new and useful Improvements in Arsenostibino Compounds and Processes of Making Same, of which the following is a specification.

We have found that by treating aromatic primary arsins with halogen-antimony compounds of the formula: $Hlg_2SbX$ wherein X stands for a monovalent inorganic or organic residue, new compounds are obtained, to which the constitution: (aromatic residue)—$As=SbX$ may be attributed and which may be termed "arsenostibino" compounds. They are of therapeutical value in the treatment of infectious diseases. These arsenic antimony compounds are yellow to dark brown amorphous bodies, easily oxidizable and forming salts which are readily soluble in water and in diluted hydrochloric acid. They have a strong reducing action, for instance upon Fehling's solution, or upon an ammoniacal solution of silver nitrate.

The following example illustrates our invention: A methyl alcoholic solution of 20 grams of 3-amino-4-oxyphenylarsin acidulated with hydrochloric acid is added to a solution of 29 grams of monophenylstibine-dichlorid $C_6H_5SbCl_2$ in methyl alcohol. The color of this mixture turns intensely brownish-red. The liquid is run into a large quantity of ether whereupon the condensation product of the formula:

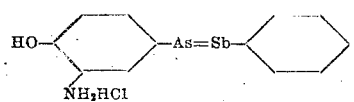

is precipitated as a yellowish-brown, flaky precipitate. The new body thus obtained is readily soluble in water, alkalis, diluted hydrochloric acid, glycerin, glycol and the like.

Having now described our invention, what we claim is:

1. The process of preparing arseno-stibino compounds of the constitutional formula: (aromatic residue)—$As=SbX$ which consists in causing halogenantimony compounds of the formula $Hlg_2SbX$, wherein X stands for monovalent residue, to act upon aromatic primary arsins.

2. As new products, salts with acids of arseno-stibino compounds of the general formula: (aromatic residue)—$As=SbX$ wherein X stands for a monovalent residue and the aromatic residue contains a salt-forming atom group, said salts being amorphous yellowish-brown to brown powders which have a strongly reducing action in an ammoniacal solution of silver nitrate, being readily soluble in water and diluted hydrochloric acid, but difficultly soluble in ether and benzene.

3. As a new product, the hydrochloric acid salt of the arseno-stibino compound of the constitutional formula

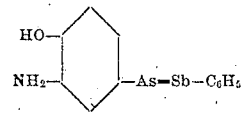

the salt being a yellowish-brown powder, difficultly soluble in ether and benzene, readily dissolving in water and diluted hydrochloric acid, having a strongly reducing action in an ammoniacal solution of silver nitrate; its solution yielding in presence of sulfuric acid a precipitate of the difficultly soluble sulfate.

In testimony whereof, we affix our signatures in presence of two witnesses.

PAUL EHRLICH.
PAUL KARRER.

Witnesses:
  JEAN GRUND,
  CARL GRUND.